(12) United States Patent
Shibayama et al.

(10) Patent No.: US 6,869,088 B2
(45) Date of Patent: Mar. 22, 2005

(54) STEERING APPARATUS FOR VEHICLE

(75) Inventors: Kazuya Shibayama, Shizuoka (JP);
Mitsuji Yamamura, Shizuoka (JP);
Toshio Ohashi, Tochigi (JP); Takeshi Ogasawara, Tochigi (JP); Takeshi Sato, Tochigi (JP); Toshiharu Watanabe, Tochigi (JP); Yasuhito Okawara, Tochigi (JP)

(73) Assignees: Fuji Kiko Co., Ltd., Kosai (JP);
Calsonic Kansei Corporation, Tokyo (JP)

( * ) Notice: Subject to any disclaimer, the term of this patent is extended or adjusted under 35 U.S.C. 154(b) by 146 days.

(21) Appl. No.: 10/060,084

(22) Filed: Jan. 31, 2002

(65) Prior Publication Data

US 2002/0101070 A1 Aug. 1, 2002

(30) Foreign Application Priority Data

Jan. 31, 2001 (JP) .......................................... 2001-023987

(51) Int. Cl.[7] ................................................. B62D 7/16
(52) U.S. Cl. .................... 280/93.502; 280/771; 280/778
(58) Field of Search ............................. 280/93.502, 771, 280/778; 180/425, 430, 443, 444; 74/496

(56) References Cited

U.S. PATENT DOCUMENTS

| 4,225,148 A | | 9/1980 | Andersson ................ 280/95 R |
| 6,125,962 A | | 10/2000 | Shimizu et al. |
| 6,161,645 A | * | 12/2000 | Tabata et al. ............... 180/444 |
| 6,196,072 B1 | | 3/2001 | Toyohira et al. ....... 73/862.333 |

FOREIGN PATENT DOCUMENTS

| DE | 42 06 773 A1 | 9/1992 |
| EP | 1 053 927 A1 | 11/2000 |
| JP | 9-132158 | 5/1997 |
| JP | 10-138937 | 5/1998 |
| JP | 10-138938 | 5/1998 |
| JP | 2000-16318 | 1/2000 |
| JP | 2000-28451 | 1/2000 |

* cited by examiner

*Primary Examiner*—Eric Culbreth
(74) *Attorney, Agent, or Firm*—Foley & Lardner LLP

(57) ABSTRACT

A steering apparatus for a vehicle has: a steering shaft rotatable with a steering force applied from a steering wheel; a cable unit for transmitting a rotational force with an output member and a pair of cable wires; and a speed reducing gear disposed between the steering shaft and the cable unit. The output member makes a rotation in such a manner that the pair of cable wires are pulled relative to each other. The rotational force is transmitted from the steering shaft to a side having a tire-and-wheel.

17 Claims, 13 Drawing Sheets

STEERING APPARATUS FOR VEHICLE

BACKGROUND OF THE INVENTION

1. Field of the Invention

The present invention relates to a steering system for a vehicle. Especially, the present invention relates to the steering apparatus for transmitting an operational (steering) force of a steering wheel to a tire-and-wheel by way of a cable unit.

2. Description of the Related Art

Japanese Patent Unexamined Publication No. JP2000028451 (JP00028451) discloses a steering apparatus for a vehicle. For securing free layout and the like of the steering apparatus, a cable unit is so constituted that a torque is transmitted by pulling a cable wire. The cable unit is disposed on a steering force transmission path between a steering wheel and a tire-and-wheel.

FIG. 18 and FIG. 19 show a schematic of the steering apparatus according to Japanese Patent Unexamined Publication No. JP2000028451 (JP00028451). The steering apparatus is constituted of a steering column, a cable unit 3, and a power steering unit 5. The steering column has a steering shaft 2 connected to a steering wheel 1. A rotational force of the steering shaft 2 is transmitted to the cable unit 3. In accordance with the rotational force transmitted from the cable unit 3, the power steering unit 5 gives the steering force, by way of a rack-and-pinion gear 4, to a front right tire-and-wheel WR and a front left tire-and-wheel WL.

The cable unit 3 is constituted of an output pulley 6, an input pulley 7, a cable 8, and a cable 9. The output pulley 6 is received in a housing 10A, and is connected to a peak end section (upper in FIG. 19) of the steering shaft 2. The input pulley 7 is disposed on a side having the power steering unit 5, and is received in a housing 10B. The cable 8 has an outer tube 8a and a cable wire 8b. The cable wire 8b is slidably disposed in the outer tube 8a, and has a first end connected to the output pulley 6 and a second end connected to the input pulley 7. The cable 9 has an outer tube 9a and a cable wire 9b. The cable wire 9b is slidably disposed in the outer tube 9a, and has a first end connected to the output pulley 6 and a second end connected to the input pulley 7.

As is seen in FIG. 19, the output pulley 6 is substantially perpendicular to an axial direction of the steering shaft 2 which is axially connected to the output pulley 6. The peak end section of the steering shaft 2 is born with a bearing 11 and a bearing 12 which are supported in the housing 10A. Moreover, a first end 8c of the cable wire 8b and a first end 9c of the cable wire 9b are wound around a cable winding groove (quintuple) formed on an outer periphery of the output pulley 6. On the other hand, the rack-and-pinion gear 4 is connected at an end of a spindle (not shown) which is fixed to a center of the input pulley 7.

The power steering unit 5 which acts as a power assistant means is supported to the housing 10B. In the housing 10B, an output shaft (not shown) is formed with a worm (not shown) which engages with a worm wheel (not shown) formed on a rotation shaft (not shown). Thereby, a torque of the power steering unit 5 is transmitted to the rotation shaft (not shown), by way of the worm (not shown) and the worm wheel (not shown).

Turning the steering wheel 1, for example, clockwise turns the output pulley 6 clockwise by way of the steering shaft 2. Then, one (cable wire 8b) of the cable wire 8b and the cable wire 9b is wound and pulled, to thereby turn the input pulley 7 counterclockwise. With this, the rack (of the rack-and-pinion 4) slides leftward, to thereby steer the front right tire-and-wheel WR and the front left tire-and-wheel WL rightward.

Simultaneously with the above, the other (cable wire 9b) of the cable wire 8b and the cable wire 9b is loosened and wound around the input pulley 7. Turning the steering wheel 1 counterclockwise causes an opposite operation to the on described in the above two paragraphs.

The steering apparatus (for the vehicle) according to the above related art, however, sets a steering angle of the steering wheel 1 equal to a winding angle (or winding length) of the following two members: The cable wire 8b wound by means of the output pulley 6 and the input pulley 7. The cable wire 9b wound by means of the output pulley 6 and the input pulley 7. In other words, the number of grooves for winding the cable wire 8b and the cable wire 9b is set equal to the number of revolutions of the steering wheel 1. Therefore, the number of grooves (for winding the cable wire 8b and the cable wire 9b) is relatively large.

Accordingly, the output pulley 6 and the input pulley 7 are large in width W (FIG. 19). As a result, an enough space is not secured for a driver around his/her legs especially where the output pulley 6 is disposed.

The output pulley 6 is directly connected to the steering shaft 2. Thereby, the above perpendicularity of the output pulley 6 to the steering shaft 2 is unavoidable, to thereby restrict freedom of layout.

BRIEF SUMMARY OF THE INVENTION

It is an object of the present invention to provide a steering apparatus for a vehicle.

According to the present invention, there is provided a steering apparatus for a vehicle. The steering apparatus comprises: a steering shaft rotatable with a steering force applied from a steering wheel; a cable unit for transmitting a rotational force with an output member and a pair of cable wires; and a speed reducing gear disposed between the steering shaft and the cable unit. The output member makes a rotation in such a manner that the pair of the cable wires are pulled relative to each other. The rotational force is transmitted from the steering shaft to a side having a tire-and-wheel.

The other objects and features of the present invention will become understood from the following description with reference to the accompanying drawings.

DETAILED DESCRIPTION OF THE EMBODIMENT

There is provided a steering apparatus for a vehicle, according to embodiments of the present invention. The steering apparatus according to each of the embodiments is applied to a tilt-type steering column.

Figure 1:
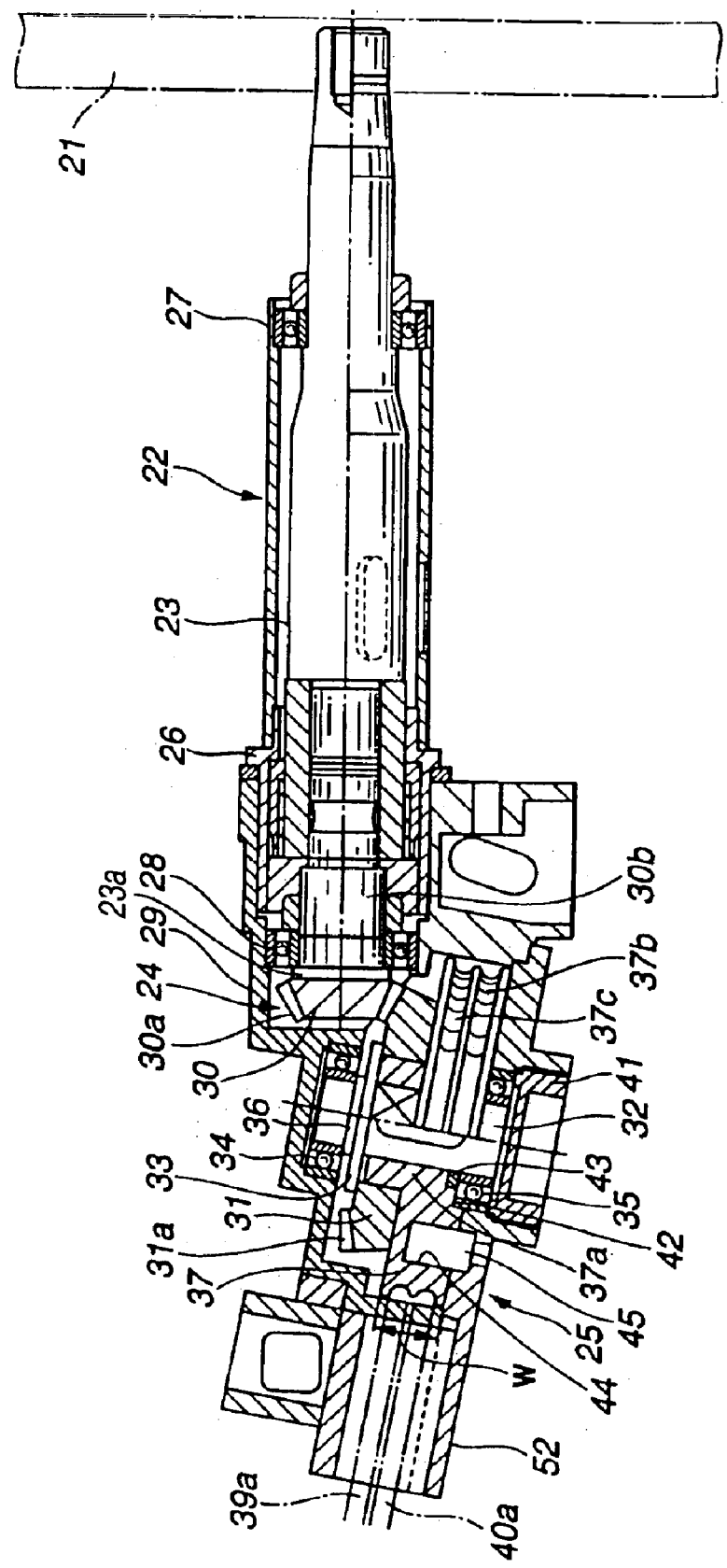
FIG. 1 is a cross section of an essential part of a steering apparatus for a vehicle, according to a first embodiment of the present invention.
Figure 2:
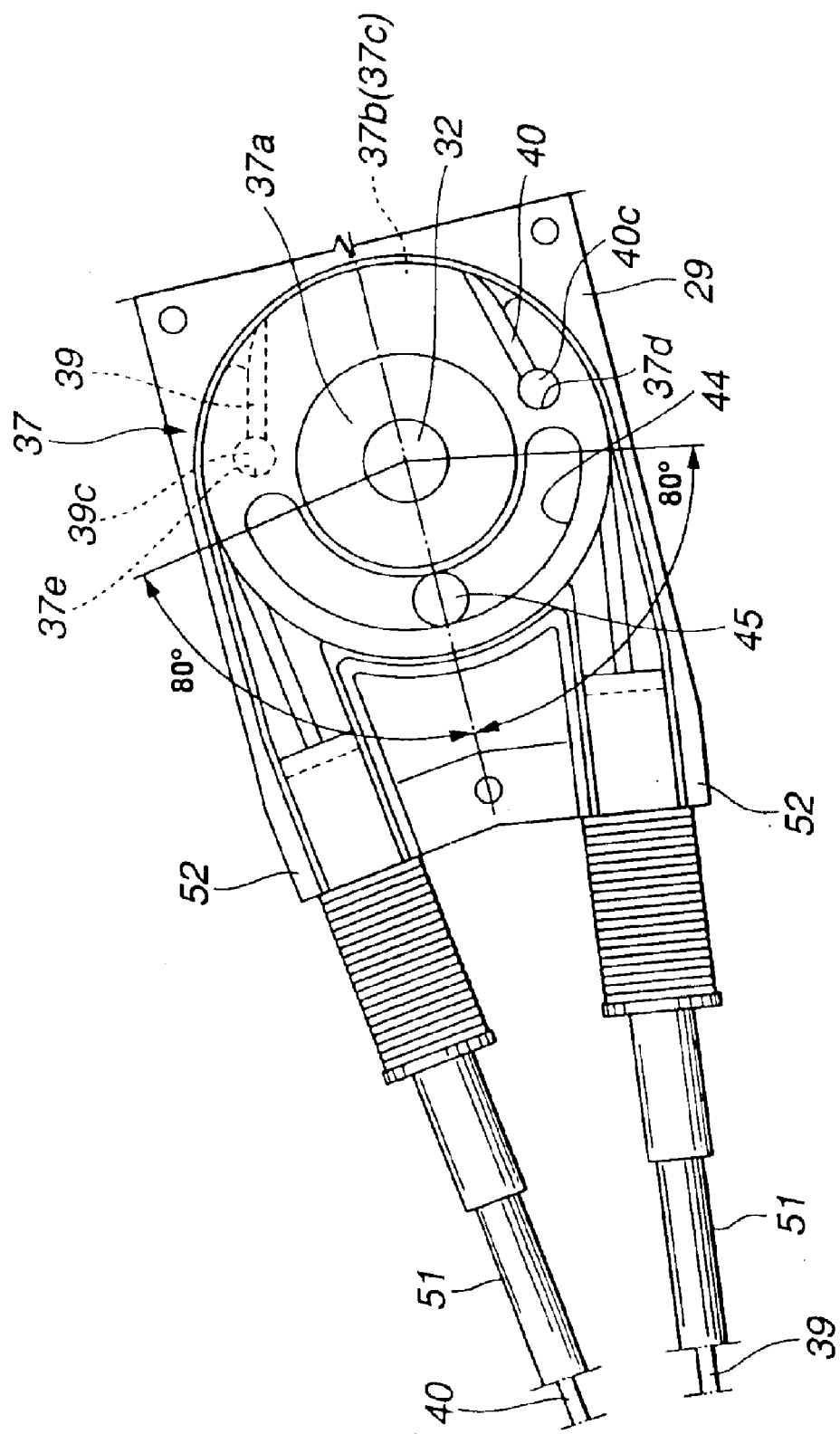
FIG. 2 is a cross section of a bottom of a cable unit 25 on an output side of the steering apparatus, according to the first embodiment.
Figure 3:
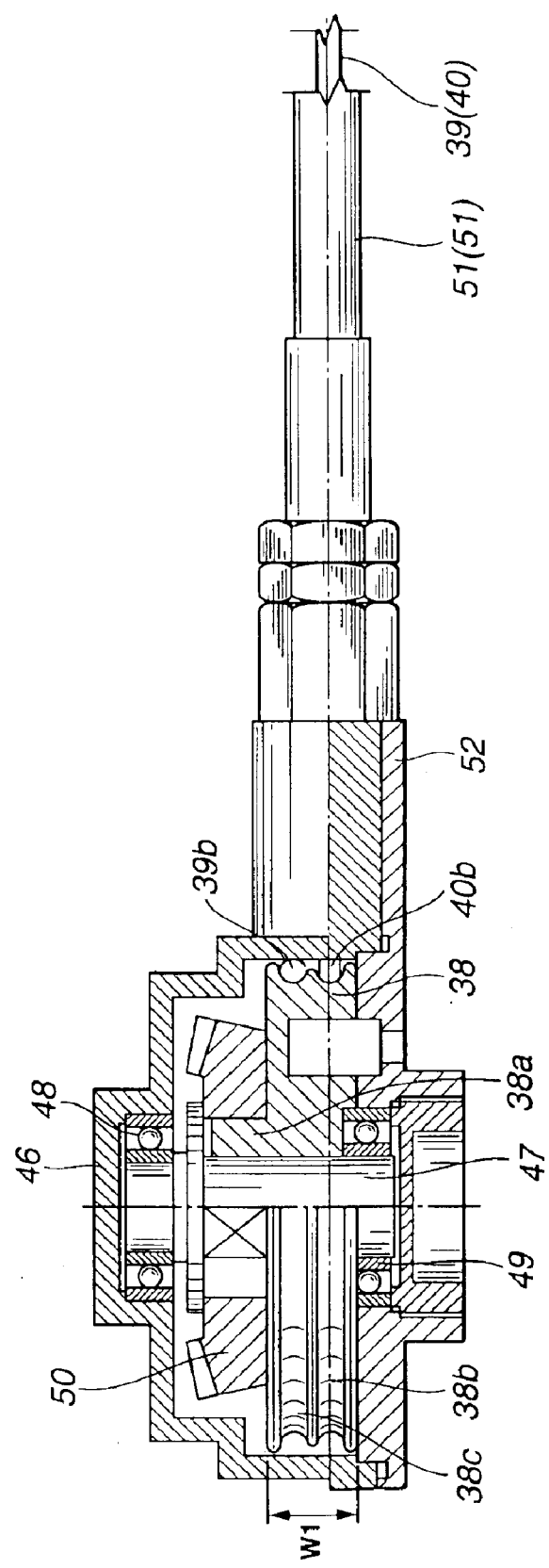
FIG. 3 is a longitudinal cross section of an essential part of a cable unit on an input side of the steering apparatus, according to the first embodiment.

As is seen in FIG. 1 to FIG. 3, there is provided a steering apparatus for a vehicle, according to a first embodiment of the present invention.

The steering apparatus is principally constituted of a steering shaft 23, a speed reducing gear 24, and a cable unit 25.

The steering shaft 23 is substantially cylindrical, and is connected to a steering wheel 21. The steering shaft 23 is inserted into a substantially cylindrical steering column 22. The speed reducing gear 24 is disposed at a peak end (left in FIG. 1) of the steering column 22. The cable unit 25 has a first end (right in FIG. 1) connected to the speed reducing gear 24, and a second end (left in FIG. 1) connected to a rack-and-pinion gear disposed on a side having a tire-and-wheel.

The steering shaft 23 has a first end (right in FIG. 1) rotatably supported with a ball bearing 27, and a second end (left in FIG. 1) supported with a support member 26. The ball bearing 27 is disposed in a backward end (right in FIG. 1) of the steering column 22. The support member 26 is disposed at a forward end (left in FIG. 1) of the steering column 22, and is substantially cylindrical.

As is seen in FIG. 1, the speed reducing gear 24 is disposed in a gear box 29. The speed reducing gear 24 is constituted of a drive bevel gear 30 having a gear teeth section 30a, and a follower bevel gear 31 having a gear teeth section 31a. The gear teeth section 30a and the gear teeth section 31a mesh with each other. The drive bevel gear 30 is slightly larger than the steering shaft 23 in outer diameter. The drive bevel gear 30 has a central base formed with a cylindrical section 30b which is serrated and connected into the second end (left in FIG. 1) of the steering shaft 23. On the other hand, the follower bevel gear 31 is far larger than the drive bevel gear 30 in outer diameter, to thereby increase a speed reduction ratio relative to the steering shaft 23. The follower bevel gear 31 is so disposed as to form an angle 90° relative to the gear teeth section 30a of the drive bevel gear 30. Moreover, the follower bevel gear 31 is rotatably supported with a spindle 32 by way of an output pulley 37 (or output member 37) of the cable unit 25. The output pulley 37 is to be described more in detail afterward. A flange section 33 is fixed to a first end (upward in FIG. 1) of the spindle 32. The flange section 33 controls upward movement of the follower bevel gear 31.

The spindle 32 has an upper end rotatably born with a first ball bearing 34 (upper) which is held in the gear box 29, and a lower end rotatably born with a second ball bearing 35 (lower) which is held in the gear box 29. Tightening a nut 41 pushes up an outer race of the second ball bearing 35, to thereby remove backlash between a ball (of the second ball bearing 35), the outer race (of the second ball bearing 35), and an inner race (of the second ball bearing 35). Then, the spindle 32 is pushed up further. Thereby, an inner race of the first ball bearing 34 is pushed up, to thereby remove backlash between a ball (of the first ball bearing 34), an outer race (of the first ball bearing 34) and an inner race (of the first ball bearing 34). The thus removed backlash of the first ball bearing 34 and the second ball bearing 35 contributes to control of the axial backlash of the spindle 32.

As is seen in FIG. 1 and FIG. 3, the cable unit 25 includes the output pulley 37, an input pulley 38, and a pair of a cable wires 39 and 40. The output pulley 37 is an output member associated with the speed reducing gear 24 (and therefore proximate the steering wheel 21). On the other hand, the input pulley 38 is remotely located with respect to the output pulley 37 and is operatively connected with the steerable road wheels. The cable wire 39 and the cable wire 40 extend between and operatively interconnect the output pulley 37 and the input pulley 38.

As is seen in FIG. 1 and FIG. 2, the output pulley 37 is received in the gear box 29. The output pulley 37 is substantially in parallel with the steering shaft 23, and forms an inclination upward in a forward direction (left in FIG. 1). The output pulley 37 is formed with a cylindrical section 37a shaped substantially into a rectangle (FIG. 1). The follower bevel gear 31 forms a hole shaped substantially into a rectangle (FIG. 1). The cylindrical section 37a is received in the hole of the follower bevel gear 31. The output pulley 37 is relatively small in width (thickness) W. The output pulley 37 has an outer periphery formed with a double-cable groove, namely, a cable groove 37b and a cable groove 37c. The spindle 32 is press fitted into a hole of the output pulley 37.

Moreover, the cylindrical section 37a has a lower end defining an inner periphery which is formed with an annular sustaining groove 42. An upper end of the second ball bearing 35 is received in the sustaining groove 42. The sustaining groove 42 has a bottom defining an inner periphery formed with a loop groove. There is provided a loop rubber member 43 (or elastic member 43) having a lower face elastically abutting on the inner race of the second ball bearing 35. The rubber member 43 is securely received in the loop groove. Tightening the nut 41 pushes up the spindle 32. Thereby, the follower bevel gear 31 is pushed up, to thereby reduce backlash between the drive bevel gear 30 and the follower bevel gear 31.

Moreover, as is seen in FIG. 2, on a bottom face on a front side (left in FIG. 2) of the output pulley 37, there is provided a control groove 44 which is in a form of an arc extending circumferentially. There is also provided a stopper pin 45 protruding in the gear box 29. A first end (upper in FIG. 2) and a second end (lower in FIG. 2) of the control groove 44 abut on the stopper pin 45. With the abutment on the stopper pin 45, the control groove 44 controls position of the output pulley 37, more specifically, a clockwise rotational end (maximum) and a counterclockwise rotational end (maximum) of the output pulley 37.

As is seen in FIG. 3, the input pulley 38 is substantially the same as the output pulley 37 in terms of constitution. The input pulley 38 is securely received in a gear box 46 on the side having the tire-and-wheel. The input pulley 38 has a central cylindrical section 38a. The input pulley 38 is rotatably supported, by way of a ball bearing 48 and a ball bearing 49, with a spindle 47 inserted into the cylindrical section 38a. Moreover, the input pulley 38 is relatively small in width (thickness) W1. The input pulley 38 has an outer periphery formed with a double-cable groove, namely, a cable groove 38b and a cable groove 38c. The cable wire 39 is wound around the cable groove 38c, while the cable wire 40 is wound around the cable groove 38b.

There is provided a bevel gear 50 substantially the same as the follower bevel gear 31 (in FIG. 1) on the output side in terms of constitution. The bevel gear 50 has area diameter, and is fixed to an outer periphery at an upper end of the cylindrical section 38a. There is also provided a bevel gear (not shown) meshing with the bevel gear 50. The bevel gear (not shown) has a small diameter, and is substantially the same as the drive bevel gear 30 (in FIG. 1) on the output side in terms of constitution. The above bevel gear (not shown) is connected to a gear section of the rack-and-pinion.

The pair of the wire cable 39 and the wire cable 40 are disposed in parallel with each other in such a manner that a constant tension is applied to both ends of each of the output pulley 37 and the input pulley 38.

The wire cable 39 has a first end section 39a (FIG. 1) wound around the cable groove 37c in a first direction, while the wire cable 40 has a first end section 40a (FIG. 1) wound around the cable groove 37b in a second direction opposite to the first direction.

Moreover, the wire cable 39 has a second end section 39b (FIG. 3) wound around the cable groove 38c in a first direction, while the wire cable 40 has a second end section 40b (FIG. 3) wound around the cable groove 38b in a second direction opposite to the first direction.

Furthermore, as is seen in FIG. 2, a wire end 39c of the cable wire 39 engages with an engagement groove 37e formed in a predetermined position of the output pulley 37, while a wire end 40c of the cable wire 40 engages with an engagement groove 37d formed in a predetermined position of the output pulley 37.

Like the output pulley 37, the input pulley 38 forms two engagement grooves (not shown) at predetermined positions. The two engagement grooves engage respectively with wire ends (not shown) of the cable wire 39 and the cable wire 40.

Each of the cable wire 39 and the cable wire 40 is slidably guided with an outer tube 51. Moreover, each of the cable wire 39 and the cable wire is guided with a tubular guide 52 on the outer pulley 37 and a tubular guide 52 on the inner pulley 38.

According to the first embodiment, turning the steering wheel 21, for example, in a clockwise direction during vehicle operation also turns the steering shaft 23 in the clockwise direction. With this, the drive bevel gear 30 turns in the clockwise direction, to thereby turn the follower bevel gear 31 in the clockwise direction (viewed from top in FIG. 1). Thereby, the output pulley 37 turns in the clockwise direction (viewed from top in FIG. 1) around the spindle 32, to thereby pull the cable wire 40. With this, the input pulley 38 turns in the direction same as that of the output pulley 37. Thereby, the bevel gear 50 turns, to thereby turn the pinion gear (of the rack-and-pinion).

According to the first embodiment, providing the drive bevel gear 30 and the follower bevel gear 31 between the steering shaft 23 and the output pulley 37 reduces a rotation angle of the output pulley 37 relative to one rotation of the steering shaft 23 (namely, steering angle of the steering wheel 21). The reduction in the rotation angle of the output pulley 37 reduces the number of turns (windings) of each of the cable wire 39 and the cable wire 40. In other words, according to the first embodiment, a stationary steering (of the steering wheel 21) to the clockwise rotational end (maximum) and the counterclockwise rotational end (maximum) makes a movement of the output pulley 37 by smaller than one revolution (±80°), more technically, smaller than one half revolution, as is seen in FIG. 2. Therefore, as described above, the output pulley 37 is allowed to be small in width W (thickness).

With the small width (thickness) W of the output pulley 37, sufficient space is secured for a driver around his/her legs, thus providing a preferred driving.

Figure 19:
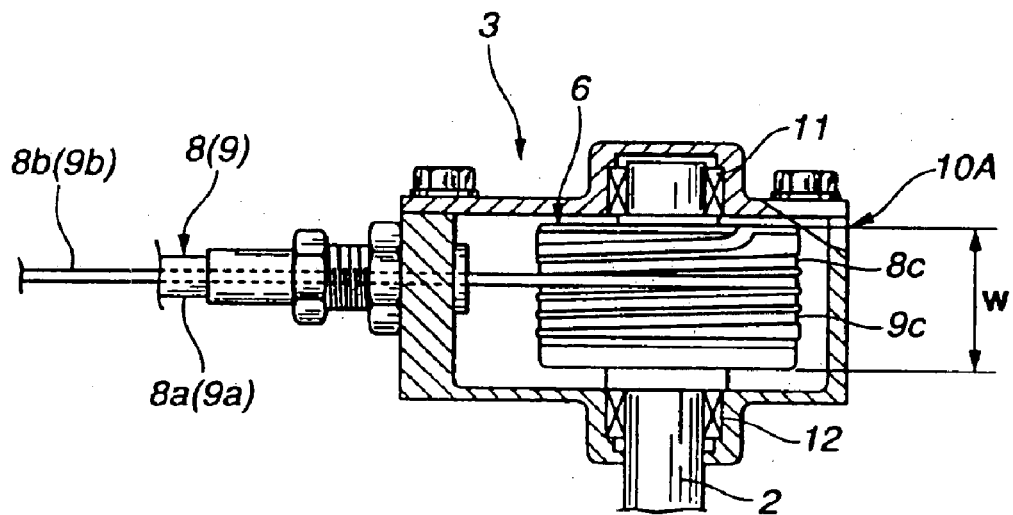
FIG. 19 is a cross section of an essential part of the steering apparatus, according to the related art.

Moreover, instead of the perpendicularity formed by the output pulley 6 and the steering shaft 2, according to the related art (FIG. 19), the output pulley 37 according to the first embodiment of the present invention is disposed substantially in parallel with the steering shaft 23 (FIG. 1). Otherwise, the output pulley 37 is adjustable to any angle relative to an axial direction of the steering shaft 23. The above summarizes that the steering apparatus according to the first embodiment improve freedom of layout.

Moreover, according to the first embodiment, the speed reducing gear 24 has the bevel gears, namely, the drive bevel gear 30 and the follower bevel gear 31. With an advantage of being bevel, an axis of the follower bevel gear 31 is substantially perpendicular to the steering shaft 23. This secures a sufficient flatness for the steering apparatus, achieving smaller size.

Moreover, the second ball bearing 35 under the output pulley 37 is received in the sustaining groove 42 of the output pulley 37, to thereby reduce overall size of the steering apparatus. This also contributes to securing the enough space for the driver around his/her legs.

Figure 18:
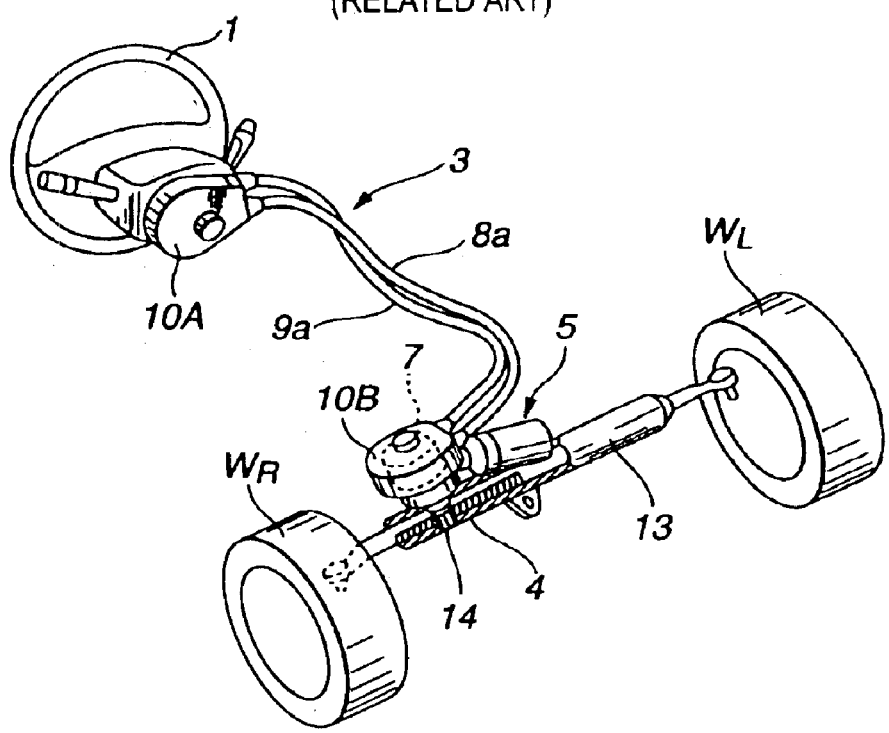
FIG. 18 is an overall view of a steering apparatus for a vehicle, according to a related art.

Moreover, the output pulley 37 is small in width (thickness) W. Moreover, use of the drive bevel gear 30 and the follower bevel gear 31 allows the output pulley 37 to have the movement smaller than one revolution (±80°), more technically, smaller than one half revolution. As a result, the cable wire 39 and the cable wire 40 are allowed to be thicker than those according to the related art in FIG. 18 and FIG. 19. With this, the cable wire 39 and the cable wire 40 are high in strength, to thereby improve reliability and durability. On top of that, each of the cable wire 39 and the cable wire 40 wound around the output pulley 38 and the input pulley 37 is short, to thereby shorten operation stroke thereof. With the shortened stroke, the backlash is reduced.

Figure 4:
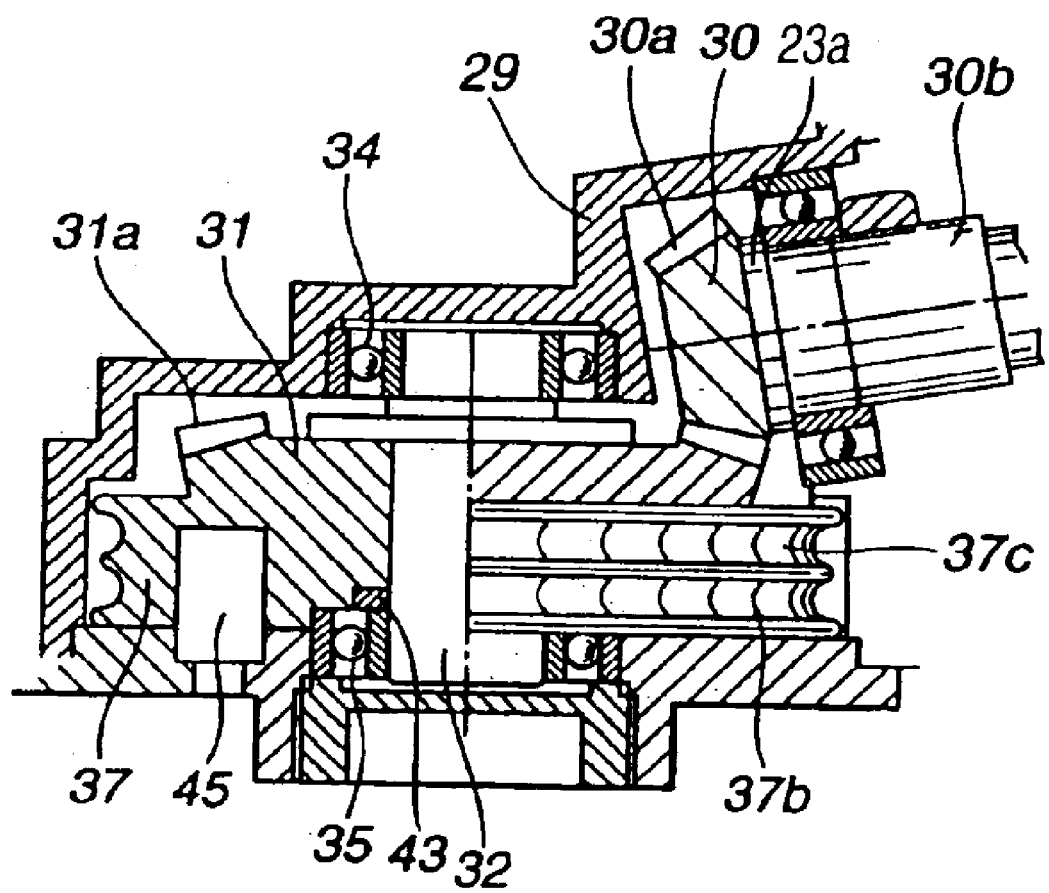
FIG. 4 is a longitudinal cross section of an essential part of the steering apparatus, according to a second embodiment.

As is seen in FIG. 4, there is provided a steering apparatus, according to a second embodiment of the present invention.

The output pulley 37 and the follower bevel gear 31 are integrated, to thereby facilitate assembly of the spindle 32 and improve component part control.

Figure 5:
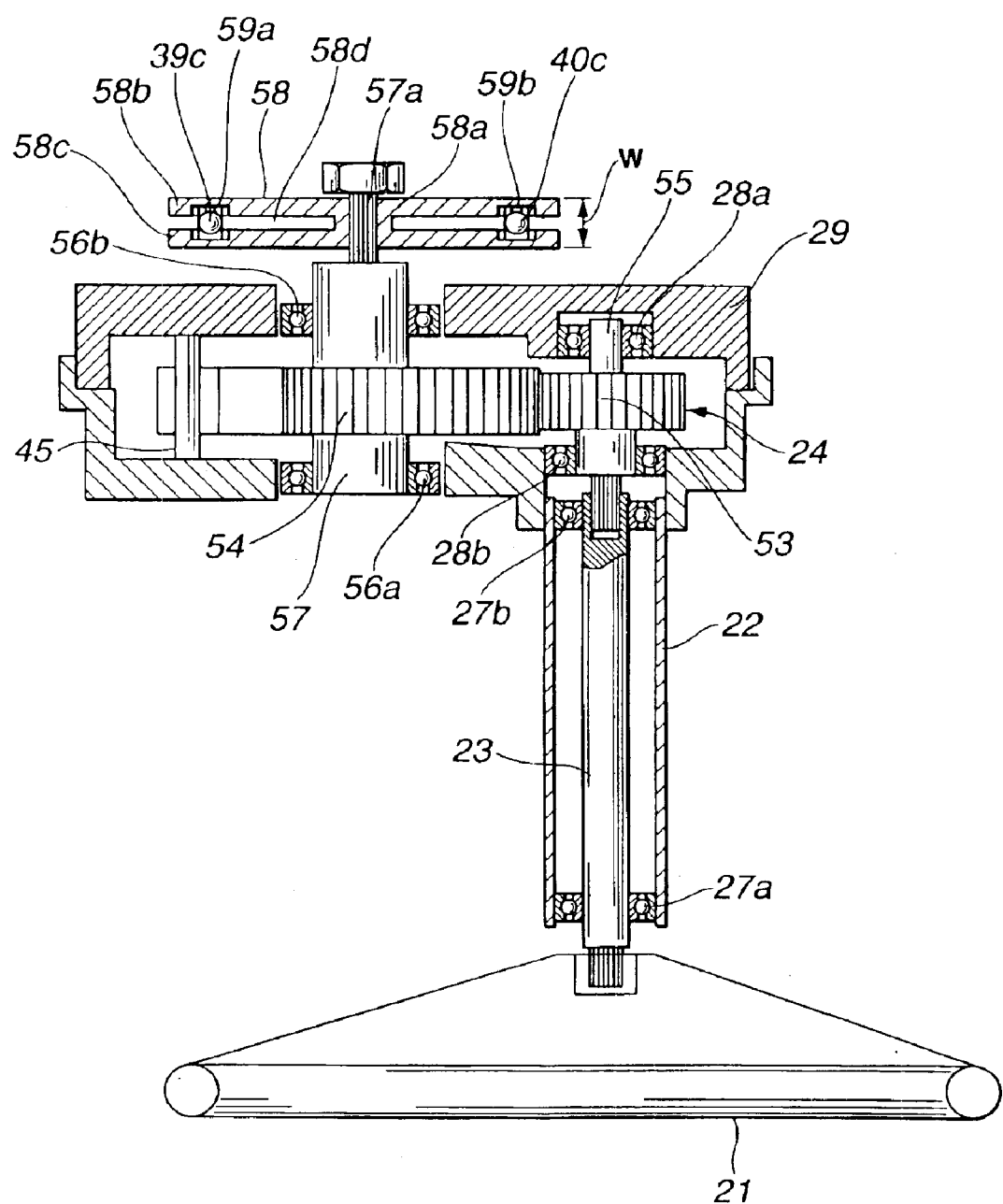
FIG. 5 is a cross section of an essential part of the steering apparatus, according to a third embodiment.

As is seen in FIG. 5, there is provided a steering apparatus, according to a third embodiment of the present invention.

The speed reducing gear 24 is constituted of spur gears. More specifically described as follows: The gear box 29 is disposed at a front end of the steering column 22. A drive spur gear 53 and a follower spur gear 54 are received in the gear box 29. The drive spur gear 53 having a small diameter is serrated and connected to the peak end of the steering shaft 23. The follower spur gear 54 is disposed alongside the drive spur gear 53, and has a gear teeth section meshing with that of the drive spur gear 53. The steering shaft 23 has a front section rotatably born with a ball bearing 27b, and a rear section rotatably born with a ball bearing 27a.

A ball bearing 28a and a ball bearing 28b are disposed in the gear box 29. The drive spur gear 53 is rotatably supported with a spindle 55 by way of the ball bearing 28a and the ball bearing 28b. On the other hand, the follower spur gear 54 is supported with a spindle 57 by way of a ball bearing 56a and a ball bearing 56b. The follower spur gear 54 is far larger in outer diameter than the drive spur gear 53. The stopper pin 45 is fixed in the gear box 29. The stopper pin 45 controls a rotation of the follower spur gear 54 within a predetermined maximum angle. Moreover, there is provided an output pulley 58 at a peak end 57a of the spindle 57.

Figure 6:
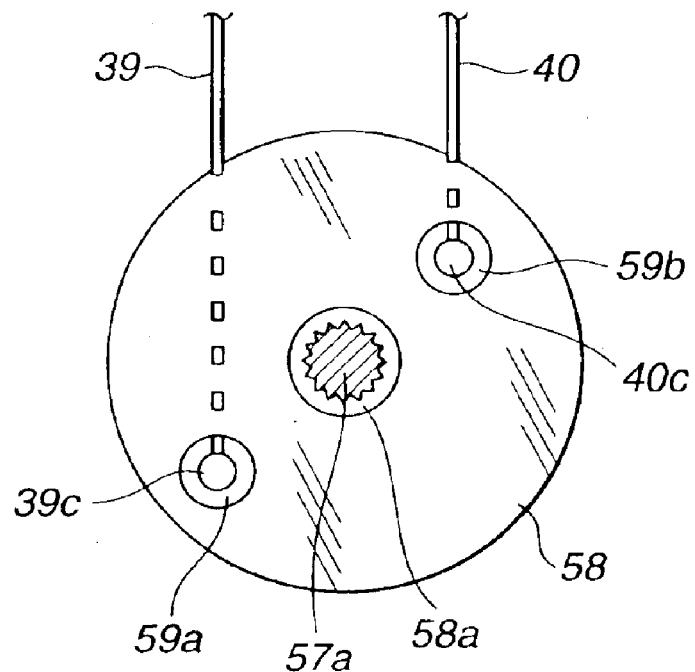
FIG. 6 is a longitudinal cross section of an output pulley 58 under operation (first aspect), according to the third embodiment.
Figure 7:
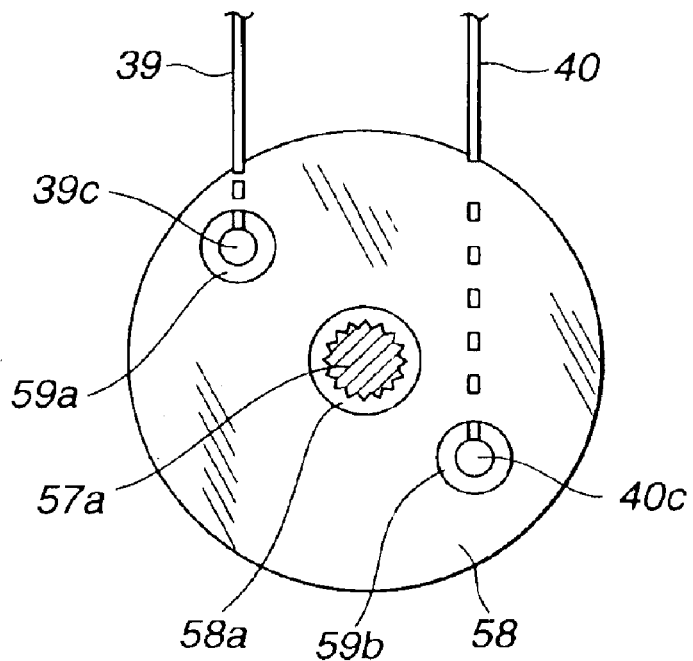
FIG. 7 is the longitudinal cross section of the output pulley 58 under operation (second aspect), according to the third embodiment.

As is seen in FIG. 5 to FIG. 7, the output pulley 58 is in a form of a double-disk (a disk 58b and a disk 58c). The peak end 57a is serrated and connected in tubular section 58a which is formed in a direction of central axis of the output pulley 58. The output pulley 58 has a width (thickness) W that is small enough to render the whole arrangement compact and convenient. Moreover, the output pulley 58 is formed with one cable groove 58d between the disk 58b and the disk 58c. The cable wire 39 and the cable wire 40 are received in the cable groove 58d. There are provided an engagement groove 59a and an engagement groove 59b, respectively, on a radially first end (right in FIG. 5) and a radially second end (left in FIG. 5) of the output pulley 58. As is seen in FIG. 6 and FIG. 7, the wire end 39c of the cable wire 39 is connected to the engagement groove 59a, while the wire end 40c of the cable wire is connected to the engagement groove 59b.

Moreover, an input pulley (not shown) on the side having the tire-and-wheel (not shown) is substantially the same as the output pulley 58 in terms of constitution.

According to the third embodiment, as is seen in FIG. 6 and FIG. 7, turning the output pulley 58 in a counterclockwise direction allows the wire end 39c of the cable wire 39 to be inserted into the cable groove 58d and relatively pulled. On the other hand, turning the output pulley 58 in a clockwise direction allows the wire end 40c of the cable wire 40 to be inserted into the cable groove 58d and relatively pulled. The above summarizes that the steering apparatus according to the third embodiment has operation and effect same as those of the first embodiment.

Moreover, the speed reducing gear 24 is constituted of the drive spur gear 53 and the follower spur gear 54 meshing with each other on a same plane, to thereby shorten the speed reducing gear 24 in forward-and-rearward direction of the vehicle. In addition, the output pulley 58 is small in width W, to thereby contribute to small size of the entire steering apparatus.

Figure 8:
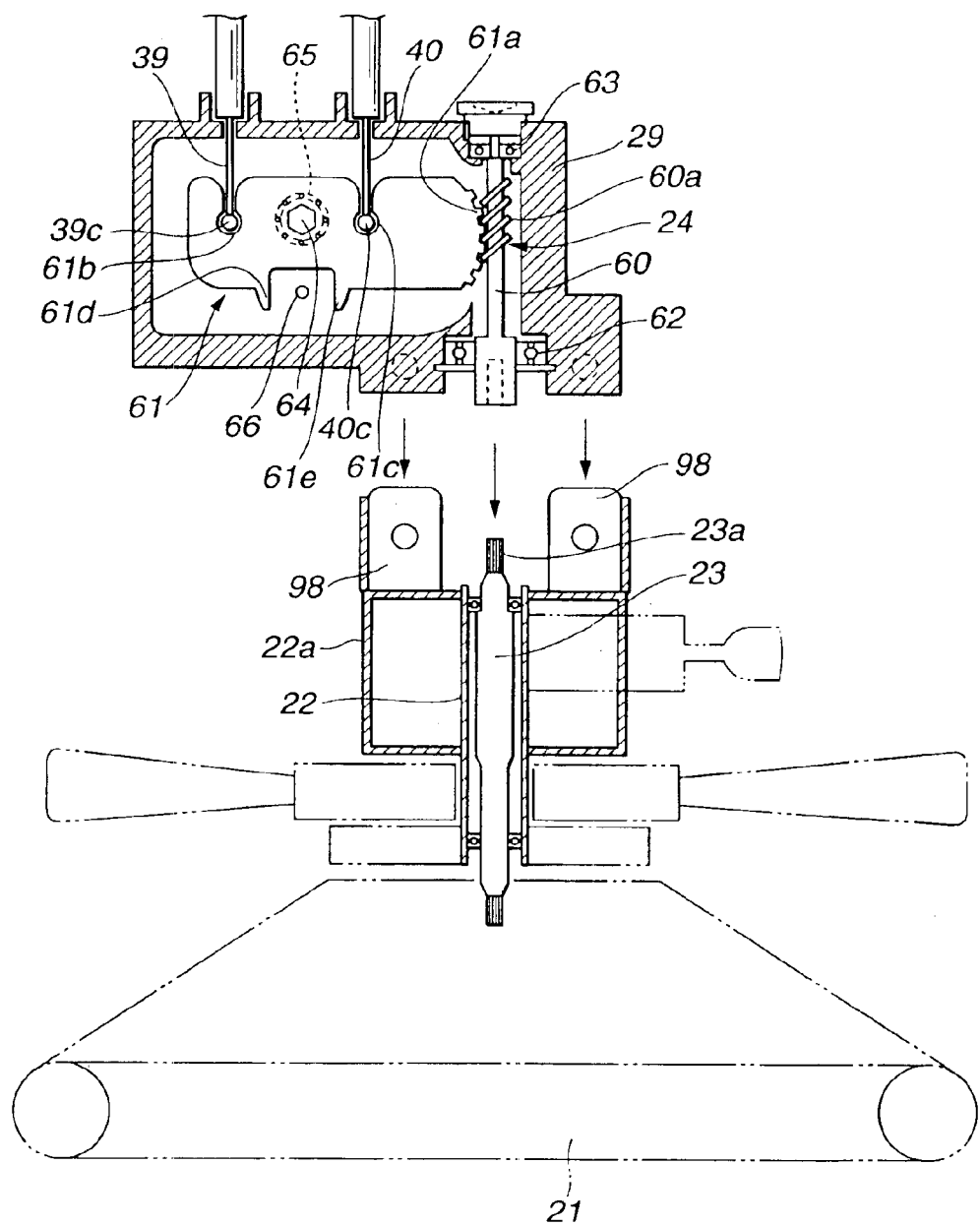
FIG. 8 is cross section of an essential part of the steering apparatus, according to a fourth embodiment.

As is seen in FIG. 8, there is provided a steering apparatus, according to a fourth embodiment of the present invention.

The speed reducing gear 24 is in a form of a worm gear. Moreover, an output member is in a form of a link. More specifically, a gear shaft 60 and a link member 61 are received in the gear box 29. The gear shaft 60 is serrated and connected to a peak end 23a of the steering shaft 23. The link member 61 meshes with the gear shaft 60, and also acts as the output member.

The gear shaft 60 has a front end (upper in FIG. 8) which is small in diameter and rotatably born with a ball bearing 63. Moreover, the gear shaft 60 has a rear end (lower in FIG. 8) which is cylindrical, large in diameter, and rotatably born with a ball bearing 62. On an outer periphery at a substantially center of the gear shaft 60, there is formed a spiral teeth section 60a.

The link member 61 is substantially rectangular and flat. The link member 61 is rotatably supported, by way of a ball bearing 65, with a spindle 64 which is inserted into a hole formed on a substantially center of the link member 61. Moreover, the link member 61 has an end (facing the gear shaft 60) formed with an arc teeth section 61a meshing with the spiral teeth section 60a. At a front end (upper in FIG. 8) of the link member 61, there are formed an engagement groove 61b and an engagement groove 61c at a predetermined interval therebetween. The engagement groove 61b engages with the wire end 39c of the cable wire 39, while the engagement groove 61c engages with the wire end 40c of the cable wire 40. At a rear end (lower in FIG. 8) of the link member 61, there are provided a pair of a protrusion 61d and a protrusion 61e integrated with the link member 61. The pair of the protrusion 61d and the protrusion 61e abut on a stopper pin 66 (protruding in the gear box 2), to thereby control the maximum rotational position (clockwise and counterclockwise) of the link member 61.

Moreover, there is provided a link member (not shown) on the side having the tire-and-wheel (not shown). The link member (not shown) acts as an input member, and is substantially the same as the link member 61 in terms of constitution. There is also provided a spindle (not shown) for rotatably supporting the link member (not shown). The spindle (not shown) is connected to a pinion gear (not shown).

Moreover, as is seen in FIG. 8, there are provided a pair of a first fixation bracket 98 and a second fixation bracket 98 at a peak end (upper in FIG. 8) of a column case 22a which is disposed on an outer periphery of the steering column 22. The pair of the first fixation bracket 98 and the second fixation bracket 98 are fixed, with a bolt, to a rear section (lower in FIG. 8) of the gear box 29.

Therefore, turning the steering wheel 21 clockwise, for example, turns the gear shaft 60 clockwise, to thereby turn the link member 61 clockwise in FIG. 8 around the spindle 64 by way of the spiral teeth section 60a and the arc teeth section 61a. With this, a gear link (not shown) on the side having the tire-and-wheel (not shown) also turns clockwise by way of the cable wire 39 and the cable wire 40, to thereby give the rightward steering force to the tire-and-wheel (not shown).

The above summarizes that the steering apparatus according to the fourth embodiment has operation and effect same as those of each of the first embodiment, the second embodiment, and the third embodiment. In addition, according to the fourth embodiment, being constituted of the worm gear, the speed reducing gear 24 is small in size. Especially, integration of the arc teeth section 61a (namely, a part of the worm gear) with the output member (link member 61) simplifies constitution, to thereby contribute to small steering apparatus.

Figure 9:
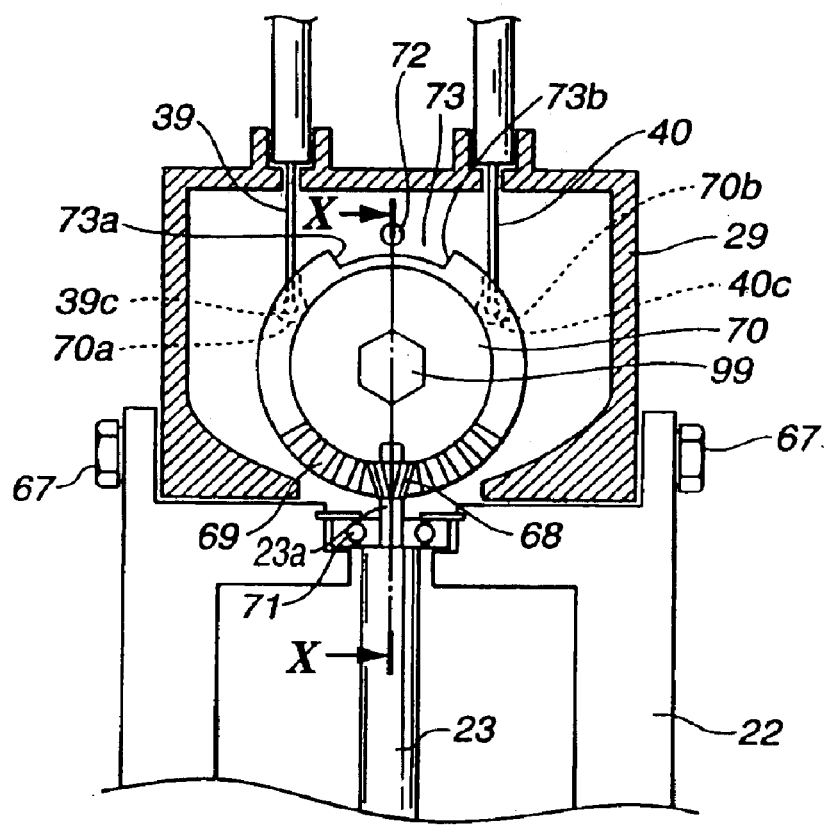
FIG. 9 is a cross section of an essential part of the steering apparatus, according to a fifth embodiment.
Figure 10:
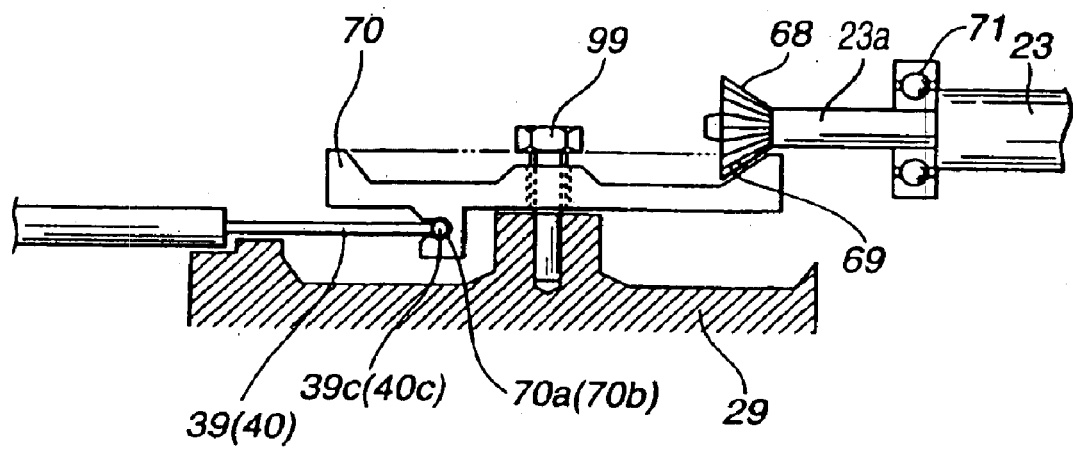
FIG. 10 is a cross section taken along lines X—X in FIG. 9, according to the fifth embodiment.

As is seen in FIG. 9 and FIG. 10, there is provided a steering apparatus, according to a fifth embodiment of the present invention.

The speed reducing gear 24 is constituted of a rack-and-pinion gear. More specifically, the steering shaft 23 is inserted into the peak end of the steering column 22. The gear box 29 is mounted on the peak end of the steering column 22 with a bolt 67. In the gear box 29, there are provided a pinion gear 68, and a rotating member 70. The pinion gear 68 is in a form of a bevel, and fixed to the peak end of the steering shaft 23. The rotating member 70 is in a form of a disk, and acts as an output member having a rack gear 69 in a form of an arc. The rack gear 69 has an outer upper face meshing with the pinion gear 68. The forward end of the steering shaft 23 is born with a ball bearing 71.

The rotating member 70 is rotatably supported with a fixed spindle 99 which penetrates through substantially a center of the rotating member 70. On a left side at a forward end of the rotating member 70, there is formed an engagement section 70a for engaging with the wire end 39c of the cable wire 39. On a right side at the forward end of the rotating member 70, there is formed an engagement section 70b for engaging with the wire end 40c of the cable wire 40. At the forward end of the rotating member 70, there is formed a control groove 73 in a form of an arc. The control groove 73 has a first end 73a and a second end 73b for abutting on the stopper pin 72. The abutment of the control groove 73 on the stopper pin 72 controls the rotating member 70 within the maximum rotational position clockwise and counterclockwise.

Therefore, turning the steering wheel 21 clockwise or counterclockwise turns the steering shaft 23, to thereby turn the pinion gear 68. The thus turned pinion gear 68 turns the entire rotating member 70 in one direction by way of the rack gear 69. With this, one of the cable wire 39 and the cable wire 40 is pulled, to thereby give the force to the tire-and-wheel in cooperation with a power steering apparatus (not shown).

The above summarizes that the steering apparatus according to the fifth embodiment has operation and effect same as those of the first embodiment. Especially, according to the fifth embodiment, the rack gear 69 is integrated with the rotating member 70, to thereby contribute to small size of the entire steering apparatus.

Figure 11:
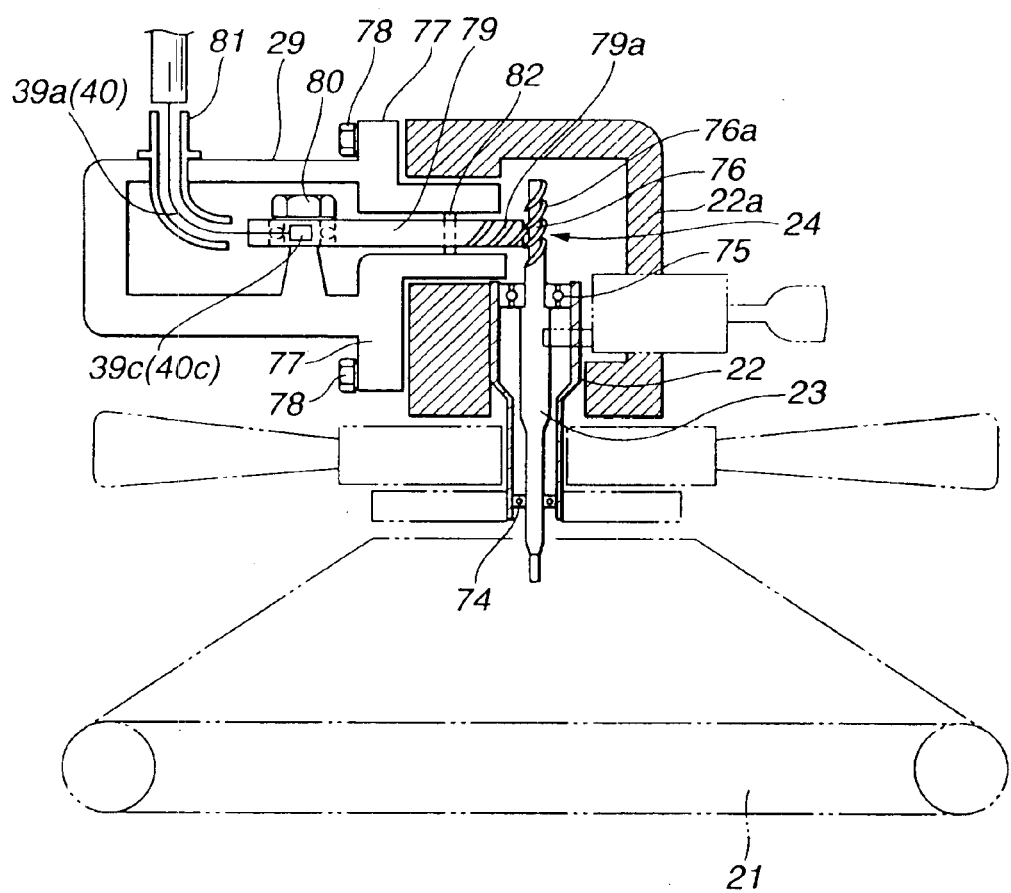
FIG. 11 is a cross section of an essential part of the steering apparatus, according to a sixth embodiment.
Figure 12:
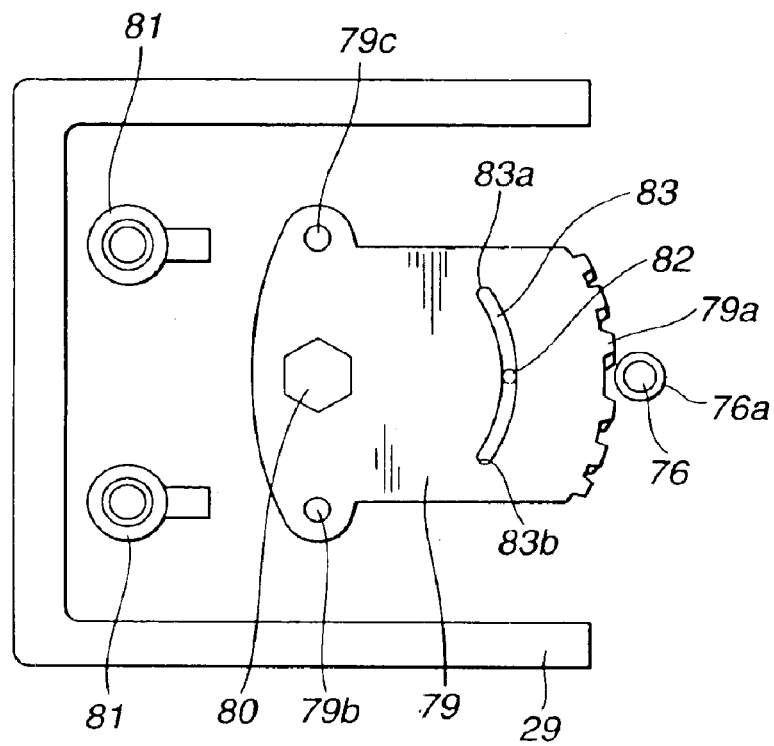
FIG. 12 is a cross section of an essential part of the steering apparatus, taken from a different viewing angle, according to the sixth embodiment.
Figure 13:
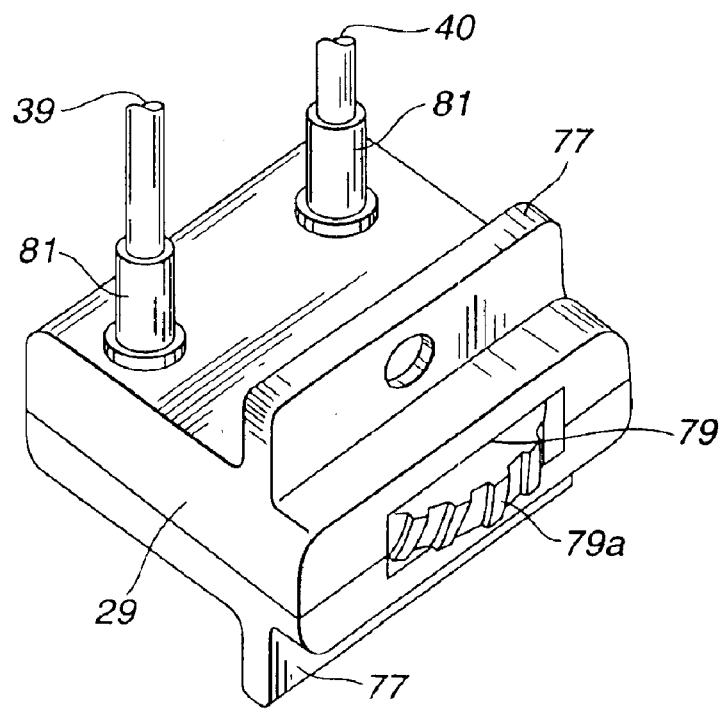
FIG. 13 is a perspective view of the essential part of the steering apparatus, according to the sixth embodiment.
Figure 14:
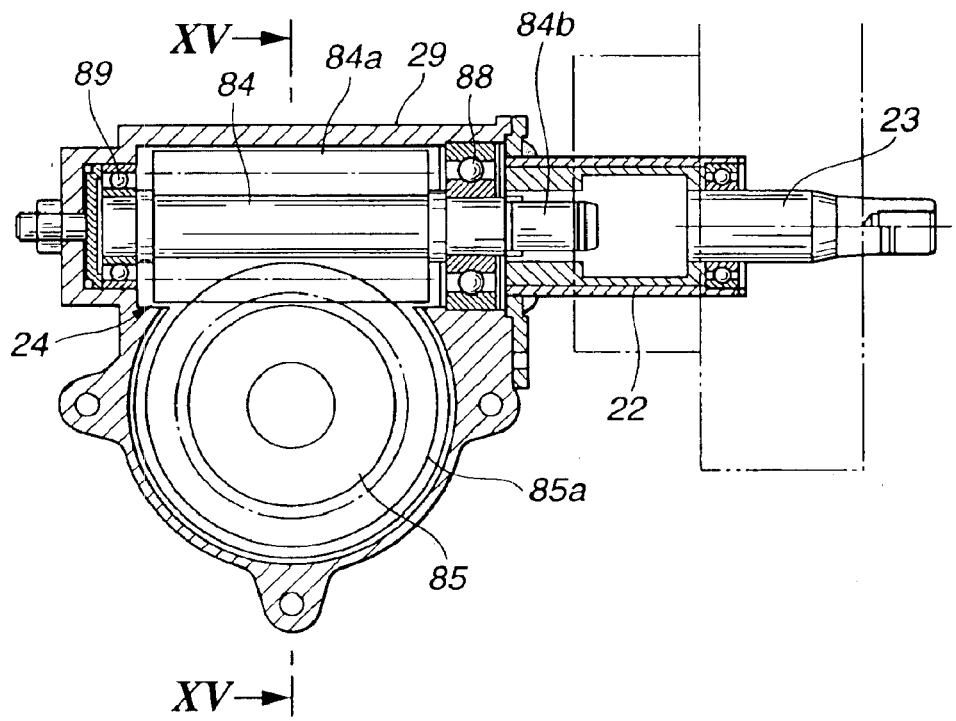
FIG. 14 is a cross section of an essential part of the steering apparatus, according to a seventh embodiment.

As is seen in FIG. 11 to FIG. 13, there is provided a steering apparatus, according to a sixth embodiment of the present invention.

Like the fourth embodiment in FIG. 8, the speed reducing gear 24 according to the sixth embodiment is in the form of the worm gear. The constitution of the speed reducing gear 24 and the constitution of a output member, however, are different from those of the fourth embodiment.

The speed reducing gear 24 is disposed in the steering column 22 which mounts a column case 22a at a front end of the steering column 22. The steering shaft 23 is inserted into the steering column 22, and rotatably born with a ball bearing 74 (rear) and a ball bearing 75 (front). A gear shaft 76 is integrated with the peak end of the steering shaft 23. The gear shaft 76 has an outer periphery formed with a spiral teeth section 76a.

On the other hand, as is seen in FIG. 11, the column case 22a has a sideward section mounting the gear box 29 with a bolt 78 (upper) by way of a flange section 77 (upper) and with a bolt 78 (lower) by way of a flange section 77 (lower). As is seen in FIG. 11 and FIG. 12, in the gear box 29, there is provided a link member 79 disposed perpendicular to an axial direction of the steering shaft 23. The link member 79 is substantially rectangular, and has a first end (left end in FIG. 12) rotatably supported with a spindle 80. The link member 79 has a second end (right end in FIG. 12) facing the gear shaft 76 and integrated with an arc teeth section 79a. The arc teeth section 79a meshes with the spiral teeth section 76a of the gear shaft 76.

On a first side (upper in FIG. 12) of the first end (left end in FIG. 12) of the link member 79, there is formed an engagement hole 79c for engaging with the wire end 40c of the cable wire 40 through a wire guide 81 (upper in FIG. 12). On a second side (lower in FIG. 12) of the first end (left end in FIG. 12) of the link member 79, there is formed an engagement hole 79b for engaging with the wire end 39c of the cable wire 39 through a wire guide 81 (lower in FIG. 12). In substantially a center at the second end (right end in FIG. 12) of the link member 79, there is formed an elongate arc hole 83 having a first end 83a (upper in FIG. 12) and second end 83b (lower in FIG. 12) abutting on a stopper pin 82 which is disposed in the gear box 29. With the abutment on the stopper pin 82, the elongate arc hole 83 controls the link member 79 within a maximum rotational position (clockwise and counterclockwise).

The above summarizes that the steering apparatus according to the sixth embodiment has operation and effect same as those of the first embodiment. In addition, according to the sixth embodiment, the gear shaft 76 is integrated with the steering shaft 23, and the arc teeth section 79a is integrated with the link member 79, to thereby simplify constitution of the steering apparatus. Thereby, the entire steering apparatus is small in size.

As is seen in FIG. 14 to FIG. 17, there is provided a steering apparatus, according to a seventh embodiment of the present invention.

Like the fourth embodiment and the sixth embodiment, the speed reducing gear 24 according to the seventh embodiment has a worm gear. The disposition of the speed reducing gear 24 and the constitution of the output member are different from those of the fourth embodiment and the sixth embodiment.

Figure 15:
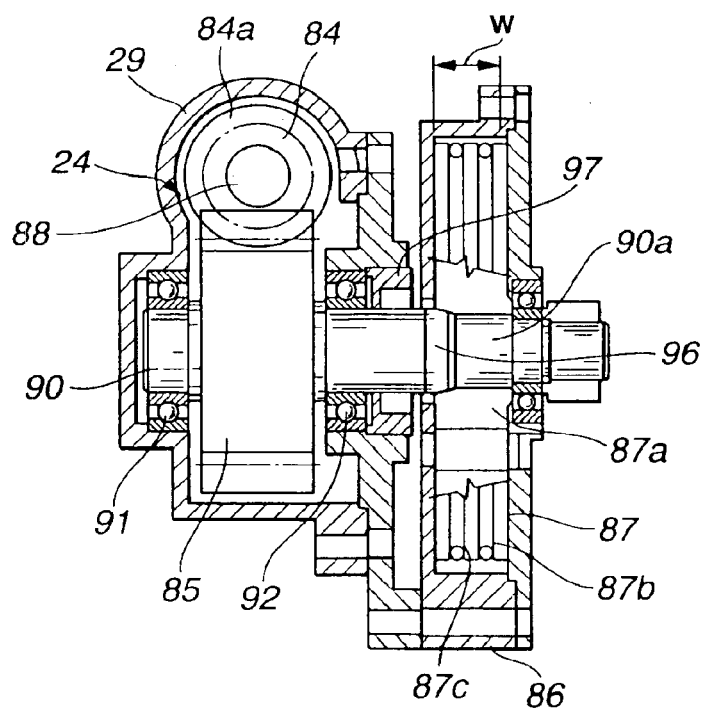
FIG. 15 is a cross section taken along lines XV—XV in FIG. 14, according to the seventh embodiment.
Figure 16:
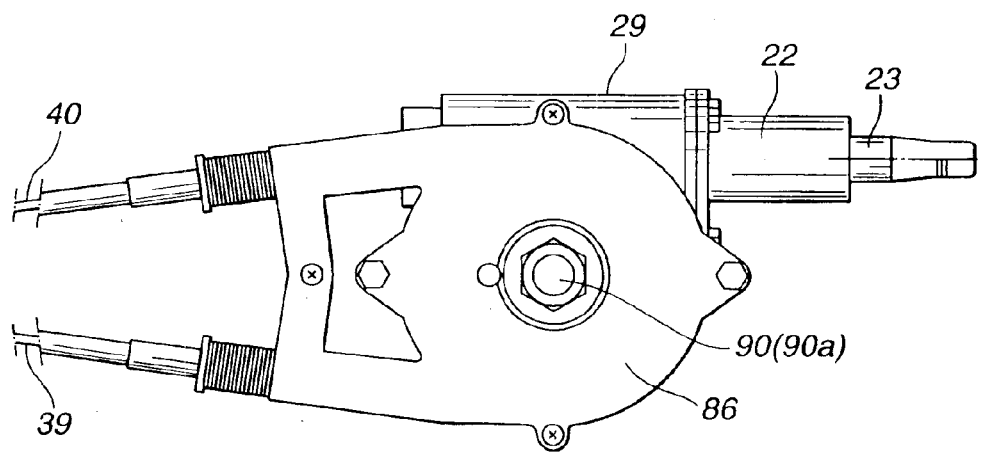
FIG. 16 is a side view of the essential part of the steering apparatus showing a housing 86, according to the seventh embodiment.

The steering shaft 22 has a first end (left in FIG. 14) mounting the gear box 29. In the gear box 29, there is received a gear shaft 84 and a loop gear 85. The gear shaft 84 is substantially cylindrical, and connected to a first end (left in FIG. 14) of the steering shaft 23. The loop gear 85 is disposed below the gear shaft 84 and perpendicular to the gear shaft 84. The loop gear 85 is formed with a teeth section 85a meshing with a spiral teeth section 84a of the gear shaft 84. Moreover, as is seen in FIG. 15, a housing 86 is mounted alongside the gear box 29. The housing 86 is disposed substantially in parallel with the gear box 29. An output pulley 87 is rotatably received in the housing 86.

The gear shaft 84 has a forward end (left in FIG. 14) rotatably born with a ball bearing 89, and a rearward end (right in FIG. 14) rotatably born with a ball bearing 88. Moreover, the gear shaft 84 has a small diameter shaft 84b which is serrated and connected to the steering shaft 23.

A spindle 90 is fixed, and inserted through a center of the loop gear 85. The loop gear 85 is rotatably supported with the spindle 90 by way of a ball bearing 91 (left in FIG. 15) and a ball bearing 92 (right in FIG. 15).

Figure 17:
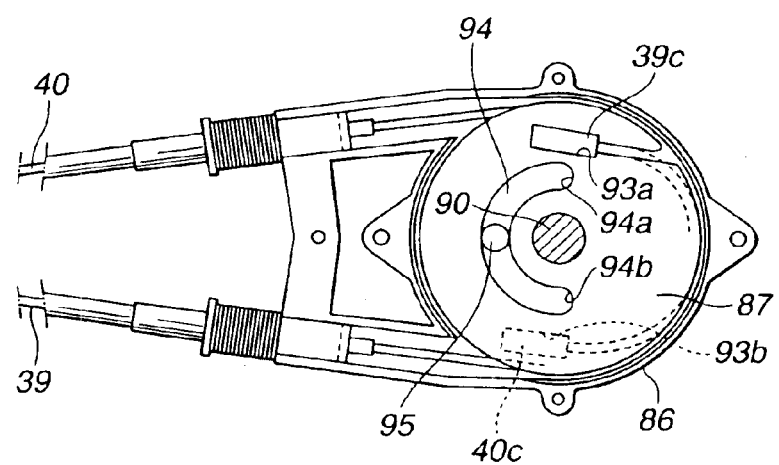
FIG. 17 is a cross section of the essential part of the steering apparatus (side view), according to the seventh embodiment.

On the other hand, the output pulley 87 is relatively small in width (thickness) W, and has a cylindrical section 87a in the center of the output pulley 87. An extended section 90a of the spindle 90 fixedly penetrates through the cylindrical section 87a. With this, the output pulley 87 turns synchronously with the loop gear 85. On an outer periphery of the output pulley 87, there is formed a double-cable groove, namely, a cable groove 87b and a cable groove 87c for winding the first end of each of the cable wire 39 and the cable wire 40. As is seen in FIG. 17, on a first side (upper in FIG. 17) of the output pulley 87, there is formed an engagement groove 93a for engaging with the wire end 39c of the cable wire 39, while on a second side (lower in FIG. 17) of the output pulley 87, there is formed an engagement groove 93b for engaging with the wire end 40c of the cable wire 40.

Moreover, in the vicinity of the cylindrical section 87a of the output pulley 87, there is formed a control groove 94 in a form of an arc circumferentially. As is seen in FIG. 17, the control groove 94 has a first end 94a and a second end 94b abutting on a stopper pin 95 which is disposed in the housing 86. The abutment of the control groove 94 on the stopper pin 95 controls the output pulley 87 within the maximum rotational position clockwise and counterclockwise.

As is seen in FIG. 15, on an outer periphery (facing the output pulley 87) of the spindle 90, there is formed a taper face 96 for preventing backlash of the output pulley 87 in an axial direction. On the other hand, the gear box 29 has a side wall facing the output pulley 87. A through hole is formed in the side wall of the gear box 29. The through hole has an inner periphery which is formed wish a female thread. An adjuster screw 97 is screwed into the female thread. Then, the adjuster screw 97 pushes an outer race of the ball bearing 92, to thereby prevent backlash of the loop gear 85 in an axial direction.

The above summarizes that the steering apparatus according to the seventh embodiment has operation and effect same as those of the first embodiment. In addition, according to the seventh embodiment, the loop gear 85 is separated from the output pulley 87, to thereby improve free layout of each of the component parts.

Although the present invention has been described above by reference to seven embodiments, the present invention is not limited to the seven embodiments described above. Modifications and variations of the seven embodiments described above will occur to those skilled in the art, in light of the above teachings.

More specifically, varying the speed reducing gear 24 and the output member in size and constitution is allowed in accordance with vehicle specification and size.

The entire contents of basic Japanese Patent Application No. P2001-23987 (filed on Jan. 31, 2001) of which priority is claimed is incorporated herein by reference.

The scope of the present invention is defined with reference to the following claims.

What is claimed is:

1. A steering apparatus for a vehicle, comprising:
a steering shaft rotatable with a steering force applied from a steering wheel;
a cable unit for transmitting a rotational force with a circular output member which is configured to rotate less than 180 degrees and a pair of cable wires, the output member making a rotation in such a manner that the pair of the cable wire are pulled relative to each other, the rotational force being transmitted from the steering shaft to a tire-and-wheel; and
a speed reducing gear disposed between the steering shaft and the cable unit.

2. The steering apparatus as claimed in claim 1, in which the speed reducing gear comprises a bevel gear which is connected to a peak end of the steering shaft.

3. The steering apparatus as claimed in claim 1, in which the speed reducing gear comprises a rack gear and a pinion gear.

4. The steering apparatus as claimed in claim 3, in which the rack gear is integrated with the output member which is a rotating member.

5. The steering apparatus as claimed in claim 2, in which
the bevel gear connected to the peak end of the steering shaft is drive bevel gear having a gear teeth section,
the speed reducing gear further comprises a follower bevel gear having a gear teeth section meshing with the gear teeth section of the drive bevel gear, and
the follower bevel gear defines an axis substantially perpendicular to an axis of the steering shaft.

6. The steering apparatus as claimed in claim 5, in which the follower bevel gear is larger in diameter than the drive bevel gear.

7. The steering apparatus as claimed in claim 5, in which the output member is integrated with the follower bevel gear.

8. The steering apparatus as claimed in claim 1, in which
the speed reducing gear comprises a drive spur gear and a follower spur gear disposed alongside the drive spur gear, the follower spur gear being large than the drive spur gear in diameter, and
the follower spur gear is supported with a spindle having a peak end provided with the output member which is an output pulley in a form of a double-disk.

9. The steering apparatus as claimed in claim 1, in which
the speed reducing gear comprises a gear shaft formed with a spiral teeth section, and a loop gear formed with a teeth section,
the loop gear is rotatably supported with a spindle having an extension section, and
the output member which is an output pulley is formed with a cylindrical section through which the extension section penetrates for fixation.

10. A steering apparatus as claimed in claim 1, wherein the circular output member comprises:
an arcuate slot having first and second ends, and
a pin which is stationary with respect to the circular output member and which is configured to engage the first and second ends to limit the amount of rotation of the circular output member.

11. A steering apparatus comprising:
a steering shaft rotatable with a steering force applied from a steering wheel;
a cable unit for transmitting a rotational force with an output member and a pair of cable wires, the output member making a rotation in such a manner that the pair of cable wires are pulled relative to each other, the rotational force being transmitted from the steering shaft to a tire-and-wheel steering mechanism; and
a speed reducing gear disposed between the steering shaft and the cable unit, wherein:
the output member is connected to the speed reducing gear and is rotatably mounted on a spindle,
the pair of cable wires each has a first end section connected to the output member, and a second end section operatively connected to the tire-and-wheel steering mechanism, and wherein:
the cable unit further has a first bearing for bearing a first end of the spindle and a second bearing for bearing a second end of the spindle opposite to the first end of the spindle, the second bearing being disposed inside the output member.

12. The steering apparatus as claimed in claim 11, in which an elastic member is disposed between the output member and the second bearing.

13. The steering apparatus as claimed in claim 12, in which the elastic member is a rubber member which elastically abuts on an inner race of the second bearing so as to push the spindle with a tightening force applied from a nut.

14. The steering apparatus as claimed in claim 11, in which the output member is formed with a sustaining groove for sustaining the second bearing.

15. The steering apparatus as claimed in claim 11, in which the output member is an output pulley, and the first bearing is a first ball bearing while the second bearing is a second ball bearing.

16. A steering apparatus for a vehicle, comprising:

a steering shaft inserted into a steering column having a backward end connected to a steering wheel, and a peak end opposite to the backward end;

a speed reducing gear disposed at the peak end of the steering column; and a cable unit having a first end connected to the speed reducing gear and a second end connected to a tire-and-wheel by way of a rack-and pinion of the steering apparatus, the cable unit comprising:

a circular output member connected to the speed reducing gear, the circular output member being configured to rotate less than 180 degrees, and a pair of cable wires each of which has a first end section connected to the output member and a second end section connected to the rack-and-pinion of the steering apparatus.

17. A steering apparatus as claimed in claim 16, wherein the circular output member comprises:

an arcuate slot having first and second ends, and a pin which is stationary with respect to the circular output member and which is configured to engage the first and second ends of the arcuate slot to limit the amount of rotation of the circular output member.

* * * * *